United States Patent
Kato

(10) Patent No.: US 7,995,250 B2
(45) Date of Patent: Aug. 9, 2011

(54) IMAGE-READING DEVICE EMPLOYING CONTACT IMAGE SENSOR

(75) Inventor: Tetsuya Kato, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1034 days.

(21) Appl. No.: 11/475,052

(22) Filed: Jun. 27, 2006

(65) Prior Publication Data
US 2007/0002406 A1 Jan. 4, 2007

(30) Foreign Application Priority Data

Jun. 30, 2005 (JP) ................................ 2005-193166

(51) Int. Cl.
*H04N 1/42* (2006.01)
*H01L 27/00* (2006.01)

(52) U.S. Cl. ........ 358/474; 358/486; 358/482; 358/483; 358/497; 358/496; 250/208.1

(58) Field of Classification Search .................. 358/486, 358/474, 497, 412, 445, 505, 451, 482, 483, 358/514, 513, 512; 250/208.1; 382/312, 382/318, 319
See application file for complete search history.

(56) References Cited

U.S. PATENT DOCUMENTS

| 4,816,925 | A * | 3/1989 | Hayashi | 386/126 |
| 6,424,433 | B1 * | 7/2002 | Miyauchi et al. | 358/471 |
| 6,937,369 | B2 * | 8/2005 | Shih et al. | 358/486 |
| 2002/0044699 | A1 | 4/2002 | Kozuka | |
| 2004/0212844 | A1 * | 10/2004 | Kato | 358/448 |

FOREIGN PATENT DOCUMENTS

| CN | 1261191 A | 7/2000 |
| CN | 2704980 Y | 6/2005 |
| JP | 62 6574 | 1/1987 |
| JP | H10 233902 | 9/1998 |
| JP | H10-327293 A | 12/1998 |
| JP | H11-103372 A | 4/1999 |
| JP | H11-234473 A | 8/1999 |
| JP | 2000-101803 A | 4/2000 |
| JP | 2002-185698 A | 6/2002 |
| JP | 2004-215122 A | 7/2004 |
| JP | 2004-328385 A | 11/2004 |

OTHER PUBLICATIONS

Japan Patent Office, Office Action for Japanese Patent Application No. 2005-193166 (counterpart to above-captioned patent application), mailed Aug. 13, 2010.

* cited by examiner

*Primary Examiner* — Twyler L Haskins
*Assistant Examiner* — Huo Long Chen
(74) *Attorney, Agent, or Firm* — Baker Botts L.L.P.

(57) ABSTRACT

An image-reading device includes an image sensor, a clock generator, a resolution setting unit, and a resolution switching unit. The image sensor has a plurality of photodetectors arranged linearly. The clock generator generates clocks having a clock speed. The resolution setting unit sets a resolution of the image sensor. The resolution switching unit switches the resolution set by the resolution setting unit when one of the plurality of photodetectors has read a border pixel between a pixel segment inside the original document and a pixel segment outside the original document while reading one line of the original document.

17 Claims, 11 Drawing Sheets

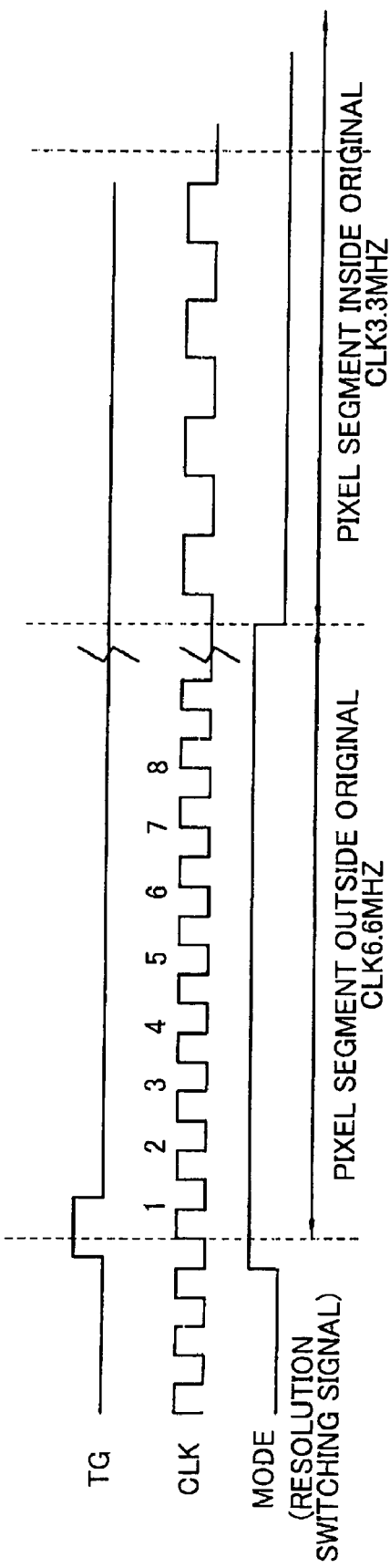

IMAGE-READING DEVICE EMPLOYING CONTACT IMAGE SENSOR

CROSS REFERENCE TO RELATED APPLICATIONS

This application claims priorities to Japanese Patent Application Nos. 2005-193166 filed on Jun. 30, 2005, the contents of which are hereby incorporated by reference into the present application.

TECHNICAL FIELD

The present invention relates to an image-reading device, and particularly to an image-reading device employing a contact image sensor (CIS).

BACKGROUND

Conventional image-reading devices, such as those disclosed in Japanese unexamined patent application publications Nos. HEI-10-233902 and SHO-62-6574, employing a contact image sensor capable of reading an A3-size original document, for example, are well known in the art. When reading an A4-size original document or other size document having a narrower width than the A3 size, this type of image-reading device shortens the time required to read one line of image data by reading a pixel segment within the original document at normal clock speed and reading an unnecessary pixel segment outside the original document at a fast clock speed for each line, thereby increasing the speed for reading the overall original document. In the example of Japanese unexamined patent application publication No. SHO-62-6574, "bits 1 through 768 are considered data corresponding to the original document, and the shift pulse SP is set to a period of 500 ns when reading this data segment and switched to a period of 125 ns, for example, when reading bits 769 through 2048. Therefore, the image-reading device of the present invention can read a line in 548 ns, which conventionally required 1040 ns."

However, when increasing the clock speed from the normal speed shown in FIG. 11A to a faster speed shown in FIG. 11B with the technology described above, the clock signal CLK at the contact image sensor connector changes, as shown in FIGS. 11A and 11B, due to an increase in radiation noise in the pixel segment outside the original document and dull waveform of clock caused by impedance in the harness. Since a stable clock level cannot be assured, the clock speed is restricted and cannot be increased to the desired speed.

SUMMARY

In view of the foregoing, it is an object of the invention to provide an image-reading device capable of increasing the image-reading speed for reading an original document that is narrower than the maximum reading size of the contact image sensor by switching to a low resolution when arriving at a border pixel between the pixel segment inside the original document and the pixel segment outside the original document of each line.

It is another object of the present invention to provide an image-reading device capable of increasing the image-reading speed for reading an original document that is narrower than the maximum reading size of the contact image sensor by switching to a low resolution and increasing the clock speed when arriving at a border pixel between the pixel segment inside the original document and the pixel segment outside the original document of each line.

The above and other objects will be attained by an image-reading device that includes an image sensor, a clock generator, a resolution setting unit, and a resolution switching unit. The image sensor has a plurality of photodetectors arranged linearly. The clock generator generates clocks having a clock speed. The resolution setting unit sets a resolution of the image sensor. The resolution switching unit switches the resolution set by the resolution setting unit when one of the plurality of photodetectors has read a border pixel between a pixel segment inside the original document and a pixel segment outside the original document while reading one line of the original document.

With this construction, the image-reading device can reduce the number of pixels outputted for the unnecessary pixel segment outside the original document when reading the original document left-justified on the original-supporting surface by switching the resolution at the border pixel between the pixel segment inside the original document and the pixel segment outside the original document in each line, and can increase the image-reading speed for the overall original document by shortening the time required to read the pixel segment outside the original document.

According to another aspect of the present invention, an image-reading device includes an image sensor, a clock generator, a resolution setting unit, and a resolution switching unit. The image sensor has a plurality of photodetectors arranged linearly. The clock generator generates clocks having a clock speed. The resolution setting unit sets a resolution of the image sensor. The resolution switching unit switches the resolution set by the resolution setting unit when a first one of the plurality of photodetectors has read a first border pixel between a first pixel segment outside the original document and a second pixel segment inside the original document and when a second one of the plurality of photodetectors has read a second border pixel between the second pixel segment inside the original document and a third pixel segment outside the original document while reading one line of the original document.

With this construction, the image-reading device can reduce the number of pixels outputted for the unnecessary pixel segment outside the original document when reading an original document centered left-to-right on the original-supporting surface by switching the resolution at the first border pixel between the first pixel segment and the second pixel segment and the border pixel between the second pixel segment and the third pixel segment in each line, and can increase the image-reading speed for the overall original document by shortening the time required to read the pixel segment outside the original document.

BRIEF DESCRIPTION OF THE DRAWINGS

The particular features and advantages of the invention as well as other objects will become apparent from the following description taken in connection with the accompanying drawings, in which:

FIG. 10 is a timing chart illustrating clock signal waveforms when increasing the clock speed in an image-reading device according to a second embodiment of the present invention.

DETAILED DESCRIPTION

The present invention attains the object of shortening the image-reading time by switching the scanning resolution to a low resolution at a border pixel between a pixel segment inside the original document and a pixel segment outside the original document of each line scanned.

Next, preferred embodiments of the present invention will be described while referring to the accompanying drawings.

Figure 1:
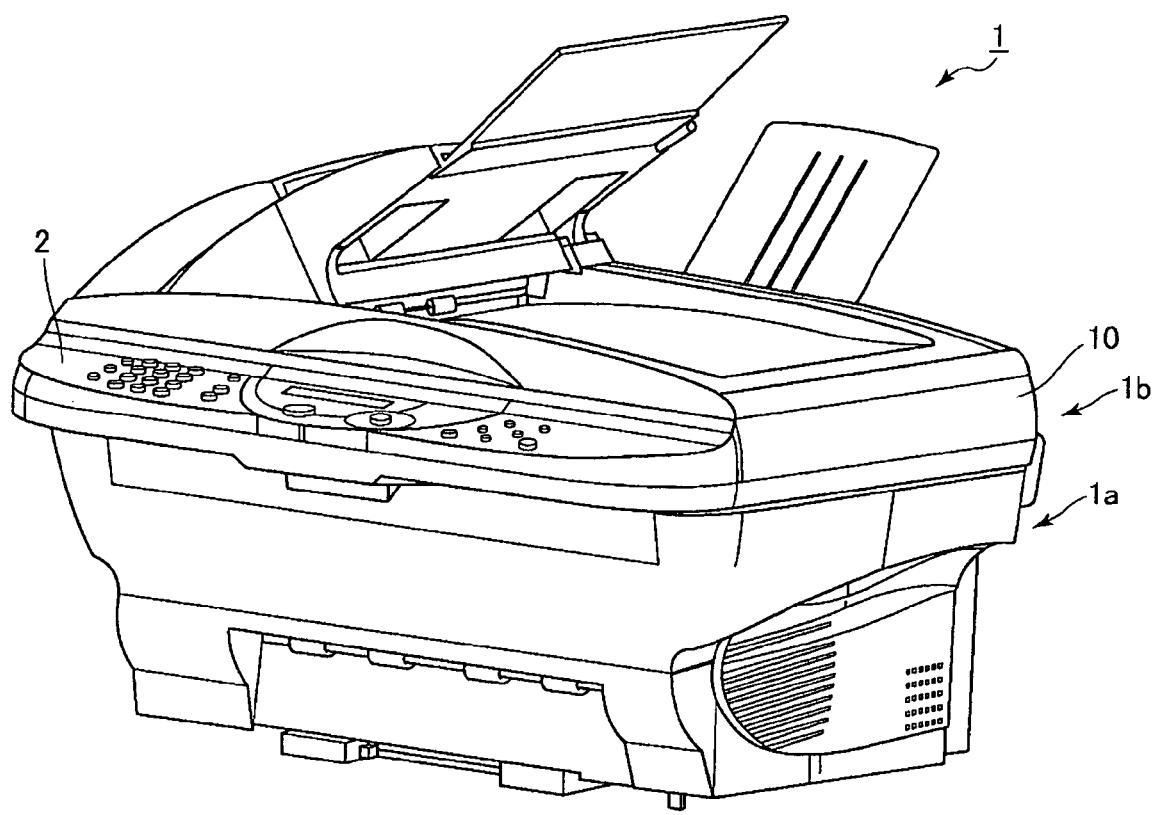
FIG. 1 is a perspective view of a multifunction device incorporating the image-reading device according to a first embodiment of the present invention.

FIG. 1 is a perspective view of a multifunction device 1 incorporating an image-reading device 10 according to a first embodiment. The multifunction device 1 has a clamshell structure configured of a lower casing 1a, and an upper casing 1b mounted on the lower casing 1a and being capable of opening and closing thereon. The image-reading device 10 is provided in the upper casing 1b. A control panel 2 is also provided on a front surface side of the upper casing 1b. The multifunction device 1 also includes a laser printer or other image-forming device in addition to the image-reading device 10. However, since this image-forming device is not directly related to the present invention, the device will not be described herein.

Figure 2:
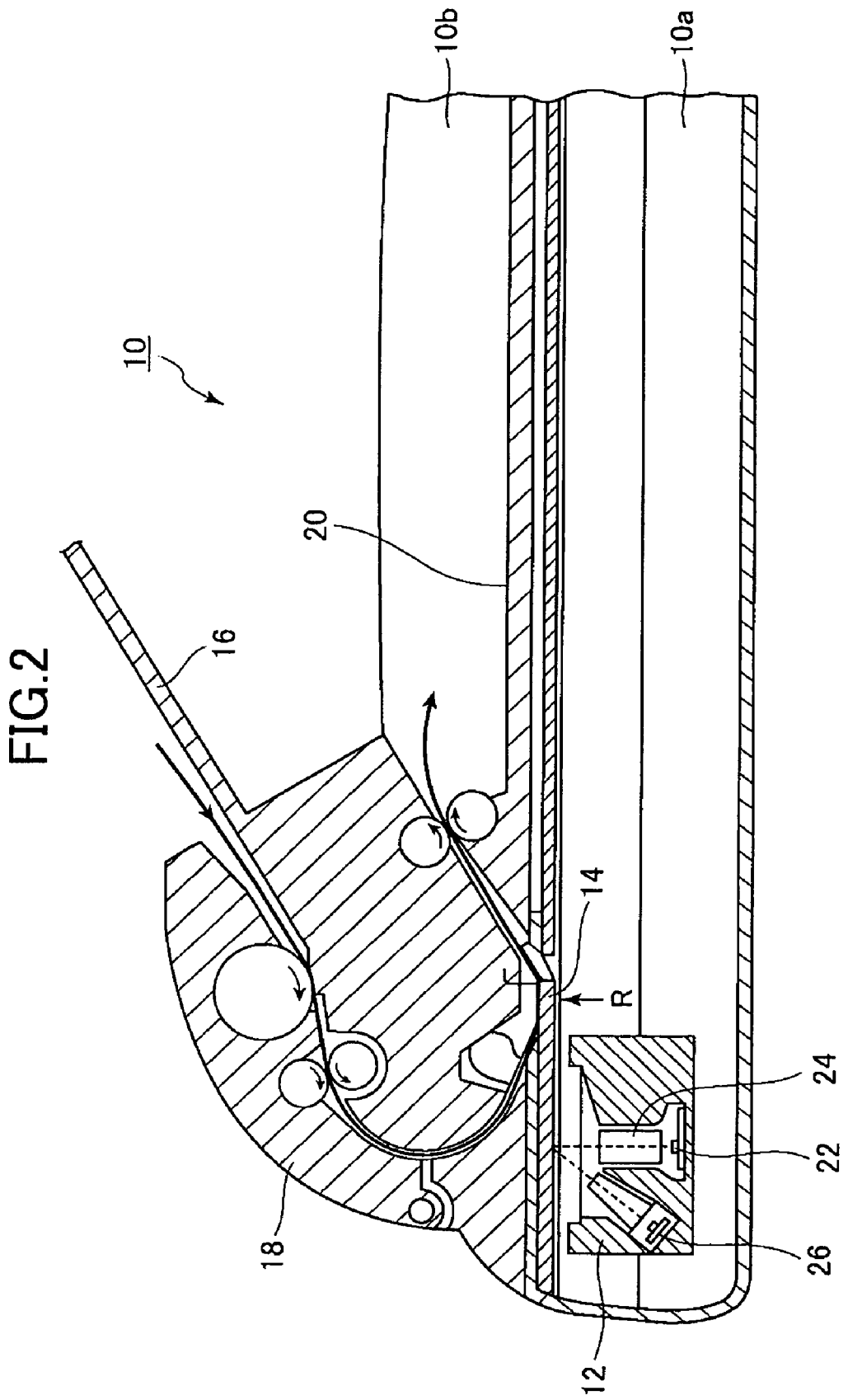
FIG. 2 is a cross-sectional view of the image-reading device according to the first embodiment.

FIG. 2 is a cross-sectional view of the image-reading device 10. As shown in FIG. 2, the image-reading device 10 includes a flatbed mechanism and an automatic document feeder (ADF). The image-reading device 10 itself also has a clamshell structure configured of a flatbed unit 10a and a cover 10b attached to the flatbed unit 10a and capable of opening and closing thereon.

The flatbed unit 10a includes a contact image sensor 12 and a platen glass 14. The cover 10b includes an original document tray 16, an original document conveying device 18, and an original document receiving tray 20.

The contact image sensor 12 includes light-receiving elements 22, such as photodetectors, a SELFOC lens 24, and a light source 26. The light source 26 irradiates light onto the original document at a reading position, and the light-receiving elements 22 receive the light reflected off the original document through the SELFOC lens 24. The contact image sensor 12 is configured to read an image based on the results of light received by the light-receiving elements 22.

A driving mechanism (not shown) is also provided for driving the contact image sensor 12 to reciprocate in the left-to-right direction so that the light-receiving elements 22 are moved directly below the reading position in the actual reading process.

Figure 3:
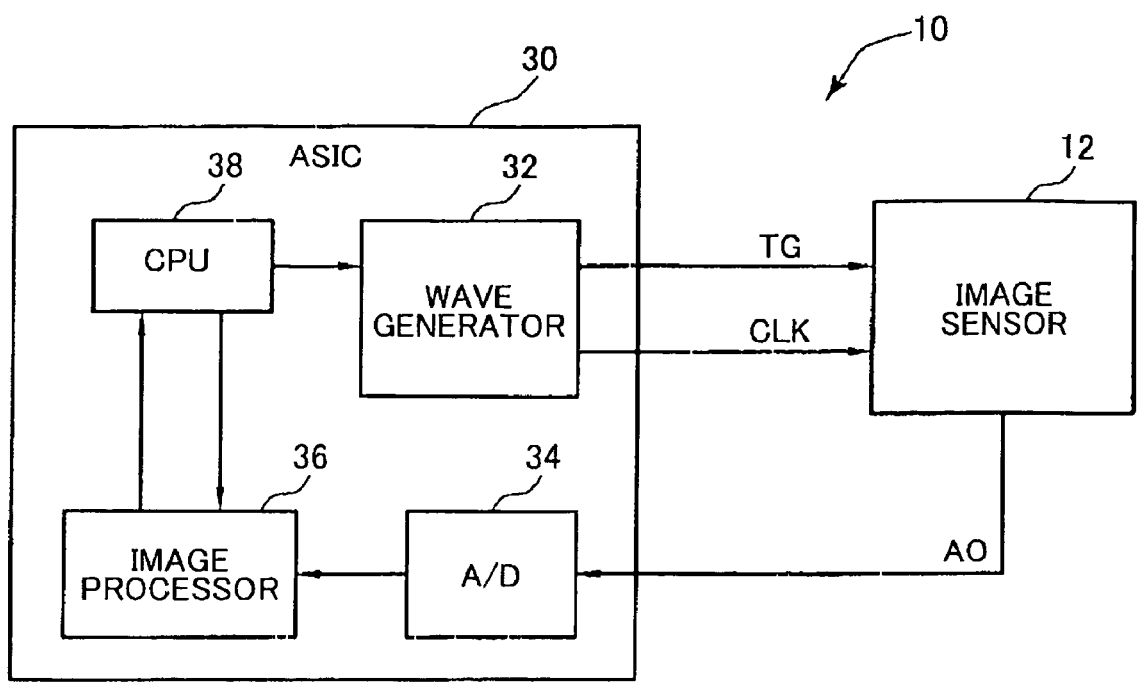
FIG. 3 is a block diagram showing the electrical configuration of the image-reading device according to the first embodiment.

FIG. 3 is a block diagram showing the electrical configuration of the image-reading device 10. As shown in FIG. 3, the image-reading device 10 includes the contact image sensor 12 mentioned above, and an application-specific integrated circuit (ASIC) 30. Upon receiving input of a trigger signal TG, the contact image sensor 12 reads an image in sync with a clock signal CLK and outputs an image signal AO representing the image read. The ASIC 30 outputs the trigger signal TG and clock signal CLK to the contact image sensor 12 and processes the image based on the image signal AO inputted from the contact image sensor 12.

The ASIC 30 is further configured of a wave generator 32 for outputting the trigger signal TG and clock signal CLK, an A/D converter 34 for converting the analog image signal AO received from the contact image sensor 12 into a digital signal, an image processor 36 for performing image processing based on the digital signal outputted from the A/D converter 34, and a CPU 38 for executing various processes.

Figure 4:
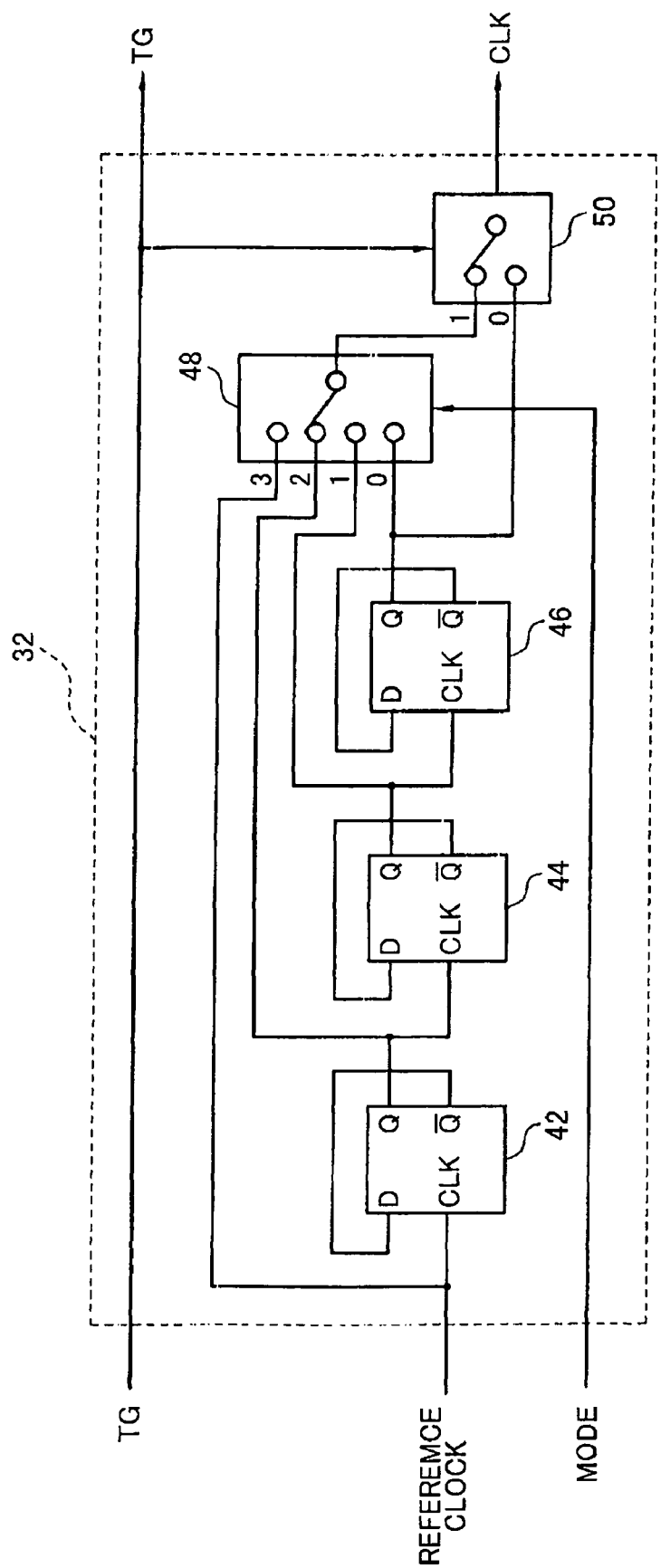
FIG. 4 is an explanatory diagram illustrating the structure of a wave generator shown in FIG. 3.

As shown in FIG. 4, the wave generator 32 receives as input the trigger signal TG generated by a trigger signal generator (not shown) in the ASIC 30, a reference clock outputted by an oscillator (not shown) in the ASIC 30 and used for operations of the CPU 38, and a resolution switching signal MODE outputted from the CPU 38. The wave generator 32 functions to output the trigger signal TG and the clock signal CLK. The wave generator 32 includes three D flip-flops 42, 44, and 46; a switch 48 for selectively outputting one of four signals inputted into respective input terminals 0-3; and a switch 50 for selectively outputting one of two signals inputted into respective input terminals 0 and 1. As can be seen from FIG. 4, the trigger signal TG inputted into the wave generator 32 is the same as the trigger signal TG outputted therefrom.

In the wave generator 32 described above, the reference clock produced by the oscillator in the ASIC 30 is both inputted into the input terminal 3 of the switch 48 and the input terminal CLK of the D flip-flop 42.

A signal outputted from the output terminal inverse Q of the D flip-flop 42 is again inputted into the input terminal D of the D flip-flop 42. As a result, the output signal from the output terminal Q of the D flip-flop 42 is a pulse signal formed by dividing the reference clock inputted into the input terminal CLK by 2. The pulse signal is inputted into both the input terminal 2 of the switch 48 and the input terminal CLK of the D flip-flop 44.

Similarly, the signal outputted from the output terminal inverse Q of the D flip-flop 44 is re-inputted into the input terminal D of the D flip-flop 44, thereby producing a pulse signal outputted from the output terminal Q of the 44 formed by dividing the pulse signal inputted into the input terminal CLK by 2 (or dividing the reference clock by 4). This pulse signal is inputted into both the input terminal 1 of the switch 48 and the input terminal CLK of the D flip-flop 46.

Similarly, the signal outputted from the output terminal inverse Q of the D flip-flop 46 is inputted into the input terminal D of the D flip-flop 46, thereby producing a pulse signal outputted from the output terminal Q of the D flip-flop 46 formed by dividing the pulse signal inputted into the input terminal CLK by 2 (or dividing the reference clock by 8). This pulse signal is inputted into both the input terminal 0 of the switch 48 and the input terminal 0 of the switch 50.

The switch 48 selects one of the signals inputted into the input terminals 0-3 based on the resolution switching signal MODE received from the CPU 38. More specifically, the image-reading device 10 can be set to read an image at one of the four resolutions 1200 dpi, 600 dpi, 300 dpi, and 150 dpi. The CPU 38 outputs the resolution switching signal MODE representing the resolution to be set. The switch 48 selects input terminal 0 when the inputted resolution switching signal MODE specifies 1200 dpi, which is the maximum resolution in the first embodiment, selects input terminal 1 when the inputted resolution switching signal MODE specifies 600 dpi, selects input terminal 2 when the inputted resolution switching signal MODE specifies 300 dpi, and selects input terminal 3 when the inputted resolution switching signal MODE specifies 150 dpi. The signal inputted into the selected input terminal of the switch 48 (i.e., the output signal of the switch 48) is inputted into the input terminal 1 of the switch 50.

The switch 50 selects one of the signals inputted into input terminals 0 and 1 based on the trigger signal TG inputted from the trigger signal generator, and outputs this selected signal as the clock signal CLK. More specifically, the switch 50 selects input terminal 0 when the trigger signal TG is at low level (OFF) and selects input terminal 1 when the trigger signal TG is at high level (ON).

Hence, when the trigger signal TG is at high level with this construction, the switch 50 selects input terminal 1 and outputs the output signal from the switch 48 as the clock signal CLK.

Figure 5:
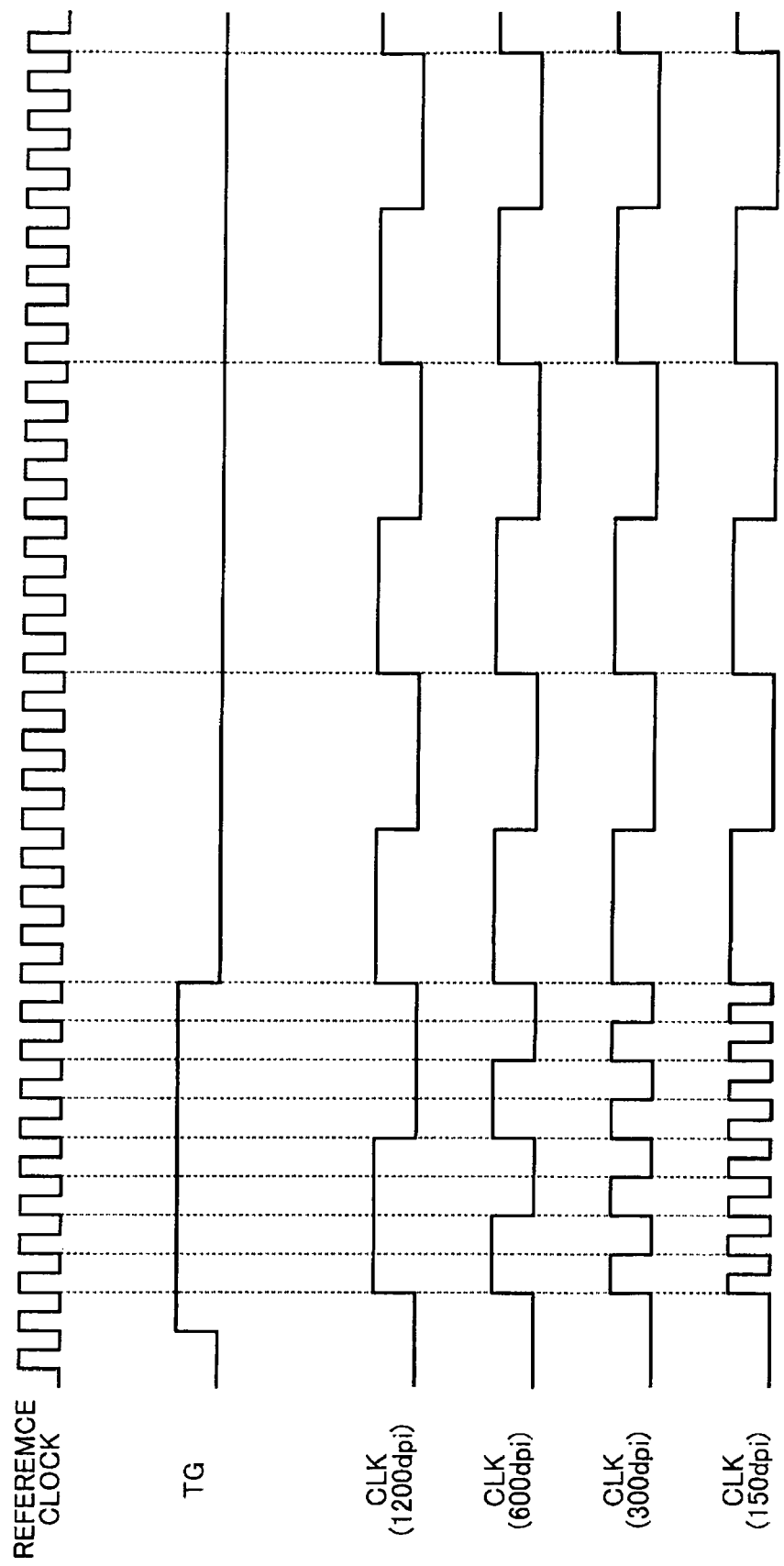
FIG. 5 is a timing chart illustrating output signals for the wave generator in FIG. 3.

As shown in FIG. 5, if the resolution is set to 1200 dpi, the switch 48 selects input terminal 0 so that the pulse signal formed by dividing the reference clock by 8 is outputted as the clock signal CLK. When the resolution is set to 600 dpi, the switch 48 selects input terminal 1 so that a pulse signal formed by dividing the reference clock by 4 is outputted as the clock signal CLK. When the resolution is set to 300 dpi, the switch 48 selects input terminal 2 so that a pulse signal formed by dividing the reference clock by 2 is outputted as the clock signal CLK. When the resolution is set to 150 dpi, the switch 48 selects input terminal 3 so that the reference clock is outputted unchanged as the clock signal CLK.

In the image-reading device 10 of the preferred embodiment, the pulse width of the trigger signal TG (that is, the high level period of the trigger signal TG) is a fixed value. The ASIC 30 sets the contact image sensor 12 to the specified resolution by the number of clock signal CLK pulses outputted when the trigger signal TG is at high level (more specifically, the number of times the clock signal CLK is on the falling edge). In the first embodiment, the number of clock signal CLK pulses when the trigger signal TG is at high level is "1" for a resolution of 1200 dpi, "2" for a resolution of 600 dpi, "4" for a resolution of 300 dpi, and "8" for a resolution of 150 dpi.

However, since the switch 50 selects input terminal 0 when the trigger signal TG is at low level, the pulse signal generated by dividing the reference clock by 8 is outputted as the clock signal CLK. Hence, when the resolution is 1200 dpi, the frequency of the clock signal CLK is not modified from a high-level trigger signal TG to a low-level trigger signal TG.

While not shown in the drawings, the image processor 36 also includes a line buffer memory for storing the image signal AO after conversion by the A/D converter 34, and a process unit for performing image processing on data in this memory.

Figure 6:
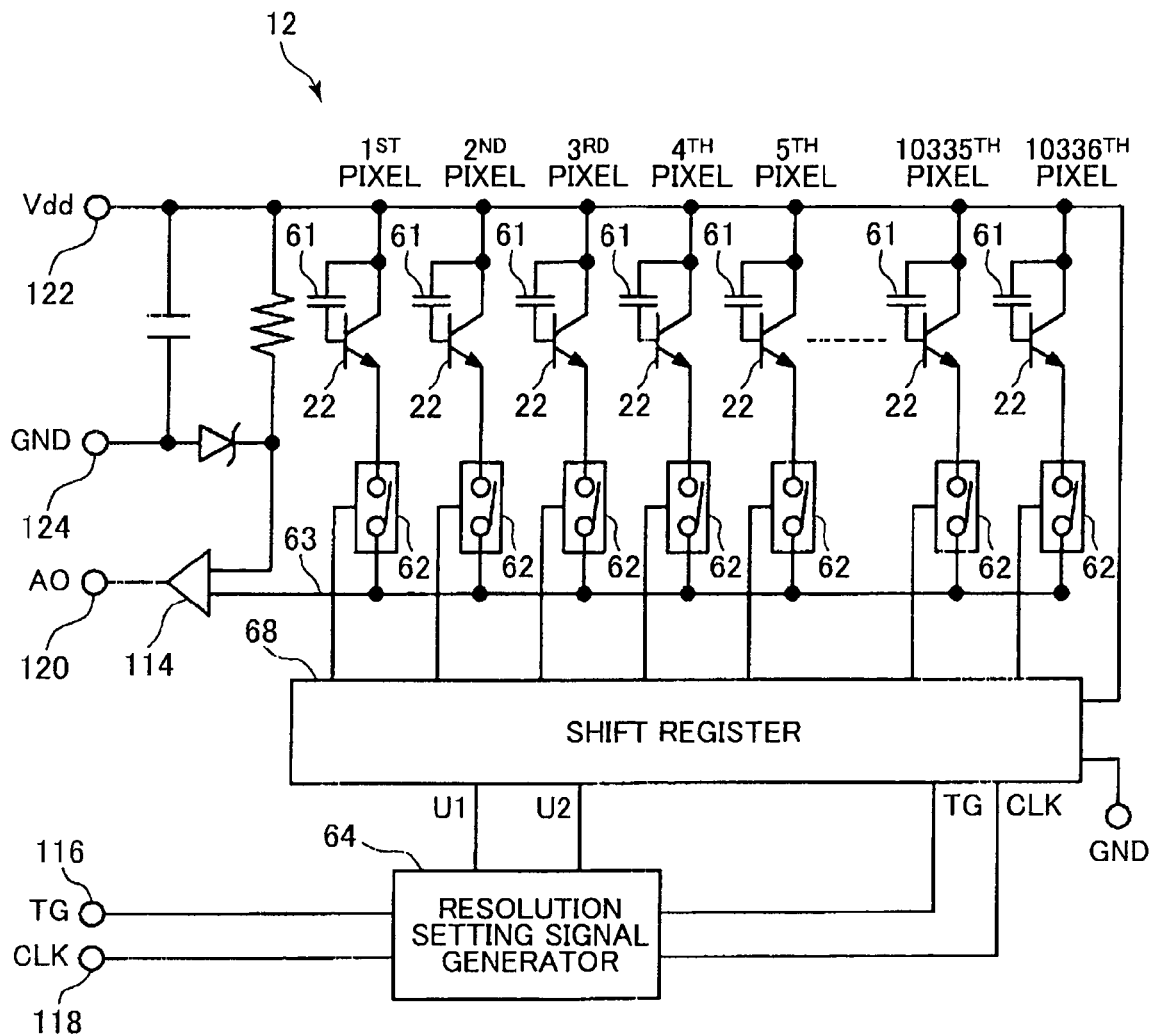
FIG. 6 is a circuit diagram illustrating the circuit structure of an image sensor shown in FIG. 3.

As shown in FIG. 6, the contact image sensor 12 includes a plurality of the light-receiving elements 22 (phototransistors in the first embodiment) arranged linearly; a plurality of switching elements 62 (channel selection switches) for turning on and off the connection between each respective light-receiving element 22 and an output signal line 63; a resolution setting signal generator 64 for generating resolution setting signals U1 and U2 based on the trigger signal TG inputted from the ASIC 30 via a TG terminal 116 and a clock signal CLK inputted from the ASIC 30 via a CLK terminal 118; and a shift register 68 for sequentially turning each of the switching elements 62 on and off based on the resolution setting signals U1 and U2. The contact image sensor 12 is also provided with a Vdd terminal 122 to which a supply voltage Vdd is applied, and a GND terminal 124 connected to ground. The linear arrangement of the light-receiving elements 22 described above also includes a staggered arrangement.

Each light-receiving element 22 includes a capacitor 61 for storing an electric charge (electric signal) that the light-receiving element 22 converts from light reflected off the original document (optical signal). In the contact image sensor 12 of the first embodiment, 10,336 light-receiving elements 22 are arranged linearly at a density corresponding to 1200 dpi so as to be capable of reading one line worth of an image on an original document.

Figure 7:
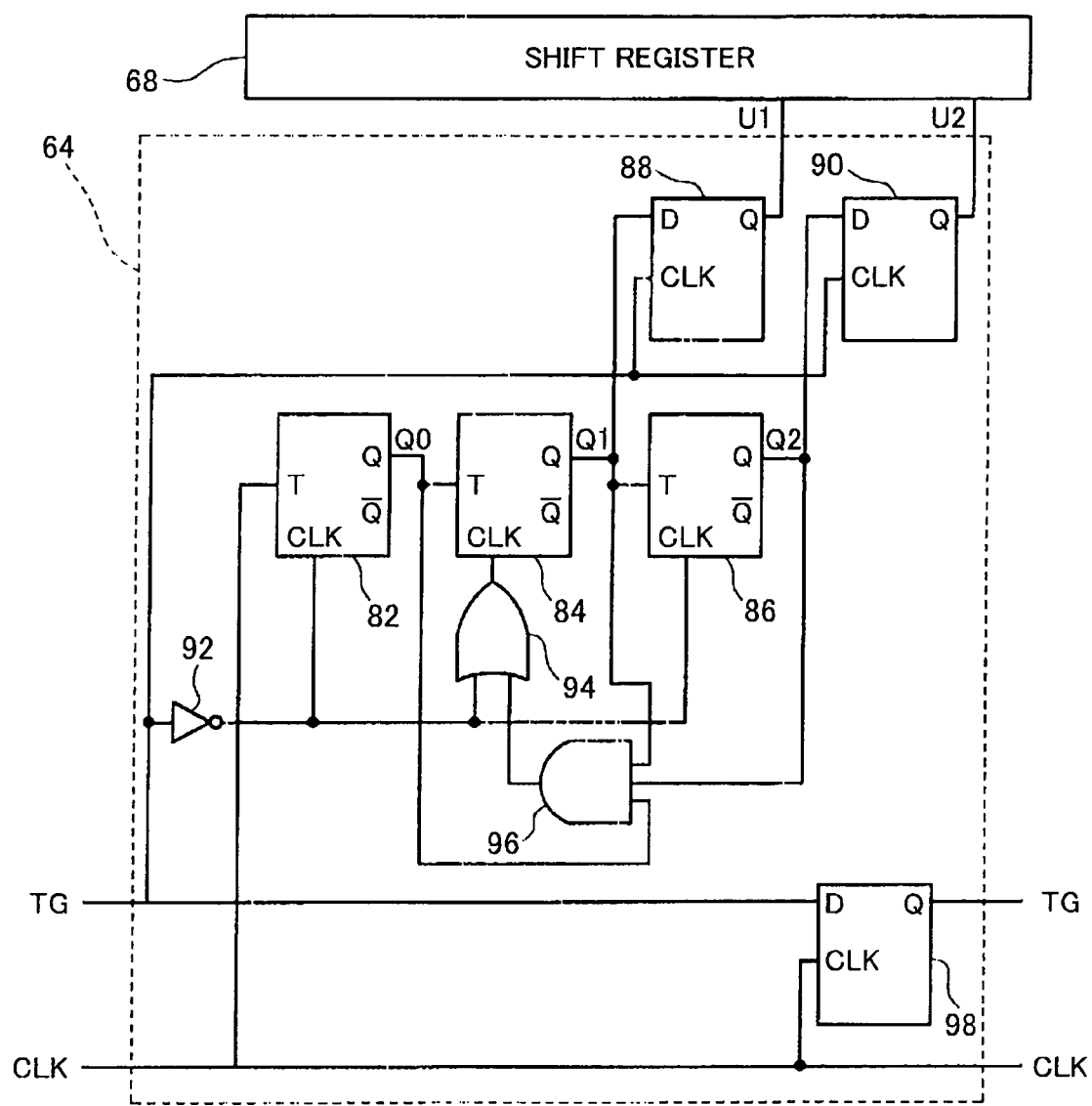
FIG. 7 is a circuit diagram illustrating the circuit structure of a resolution setting signal generator shown in FIG. 6.

As shown in FIG. 7, the resolution setting signal generator 64 is configured to receive the trigger signal TG and clock signal CLK inputted from the ASIC 30 and to output the resolution setting signals U1 and U2, the trigger signal TG, and the clock signal CLK. The resolution setting signal generator 64 includes three T flip-flops 82, 84, and 86; and three D flip-flops 88, 90 and 98.

In the resolution setting signal generator 64 having this construction, the trigger signal TG from the ASIC 30 is inputted into input terminals CLK of the D flip-flops 88 and 90 and is inputted into input terminals CLR of the T flip-flops 82, 84, and 86 after passing through a NOT circuit 92. The trigger signal TG also passes through an OR circuit 94 before being inputted into the T flip-flop 84.

The clock signal CLK from the ASIC 30 is inputted into an input terminal T of the T flip-flop 82.

An output signal from the output terminal Q of the T flip-flop 82 is inputted into an input terminal T of the T flip-flop 84 and an AND circuit 96. An output signal from the output terminal Q of the T flip-flop 84 is inputted into an input terminal T of the T flip-flop 86, the AND circuit 96, and an input terminal D of the D flip-flop 88. An output signal from the output terminal Q of the T flip-flop 86 is inputted into the AND circuit 96, and an input terminal D of the D flip-flop 90. In this way, an output signal from each output terminal of the T flip-flops 82, 84, and 86 is inputted into the AND circuit 96. The output signal of the AND circuit 96 is high level only when all of the input signals are high level. The output signal of the AND circuit 96 is inputted into the OR circuit 94.

An output signal U1 from the output terminal Q of the D flip-flop 88 and an output signal U2 from the output terminal Q of the D flip-flop 90 are inputted into the shift register 68 as the resolution setting signals U1 and U2.

With this construction, the T flip-flops 82, 84, and 86 are reset when the trigger signal TG is at low level and the resolution setting signals U1 and U2 are 0.

When the trigger signal TG rises to high level, the output signal Q0 from the output terminal Q of the T flip-flop 82 changes in the sequence "1 0 1 0 1 . . . " at a timing in which the clock signal CLK inputted into the input terminal T falls.

The output signal Q1 outputted from the output terminal Q of the T flip-flop 84 changes in the sequence "1 0 1 0 1 . . . " at a timing in which the signal Q0 inputted into the input terminal T of the T flip-flop 84 falls. Using the falling edge of the clock signal CLK as reference, the output signal Q1 changes in the sequence "0 1 1 0 0 1 1 0 . . . . "

The output signal Q2 from the output terminal Q of the T flip-flop 86 changes in the sequence "1 0 1 0 1 . . . " at a timing in which the signal Q1 inputted into the input terminal T of the T flip-flop 86 falls. Using the falling edge of the clock signal CLK as reference, the signal Q2 changes in the sequence "0 0 0 1 1 1 1 0 . . . . "

When all of the output signals Q1, Q2, and Q3 from the T flip-flops 82, 84, and 86 are "1", the output from the AND circuit 96 is "1" and, hence, the output from the OR circuit 94 is "1". As a result, the T flip-flop 84 is reset, changing the output signal Q1 to "0".

Table 1 below shows the relationship between the output signals Q1, Q2, and Q3 and the number of falling edges of the clock signal CLK after the trigger signal TG changes to high level. As described above, the output signals Q1, Q2, and Q3 become "1", "1," and "1", respectively, when the clock signal CLK falls the seventh time and immediately change to "1", "0", and "1".

TABLE 1

| No. of times CLK falls | Q0 | Q1 | Q2 |
|---|---|---|---|
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |
| 8 | 0 | 1 | 1 |

When the trigger signal TG subsequently drops to low level, the input signal Q1 inputted into the input terminal D of the D flip-flop 88 is outputted from the output terminal Q of the D flip-flop 88 as the resolution setting signal U1. Similarly, the input signal Q2 inputted into the input terminal D of the D flip-flop 90 is outputted from the output terminal Q of the D flip-flop 90 as the resolution setting signal U2.

Table 2 shows the relationship between the resolution setting signals U1 and U2 and the number of times that the clock signal CLK falls while the trigger signal TG is at high level.

TABLE 2

| No. of times CLK falls | U1 | U2 | Resolution (dpi) |
|---|---|---|---|
| 1 | 0 | 0 | 1200 |
| 2 | 1 | 0 | 600 |
| 4 | 0 | 1 | 300 |
| 8 | 1 | 1 | 150 |

As mentioned above, the ASIC 30 sets the resolution of the contact image sensor 12 based on the number of times that the clock signal CLK falls while the trigger signal TG is at high level. Hence, as shown in Table 2, the values "0" and "0" for the resolution setting signals U1 and U2, respectively, when the fall number is "1" represent a resolution of 1200 dpi; the values "1" and "0" for the resolution setting signals U1 and U2 when the fall number is "2" represent a resolution of 600 dpi; the values "0" and "1" for the resolution setting signals U1 and U2 when the fall number is "4" represent a resolution of 300 dpi; and the values of "1" and "1" for the resolution setting signals U1 and U2 when the fall number is "8" represent a resolution of 150 dpi.

The shift register 68 operates based on the values of resolution setting signals U1 and U2 (in other words, the resolution set by the ASIC 30). The operations of the shift register 68 will be described in detail later.

An output signal corresponding to the level of the trigger signal TG inputted into the input terminal D of the D flip-flop 98 is outputted from the corresponding output terminal Q when the clock signal CLK inputted into the input terminal CLK falls.

Figure 8:
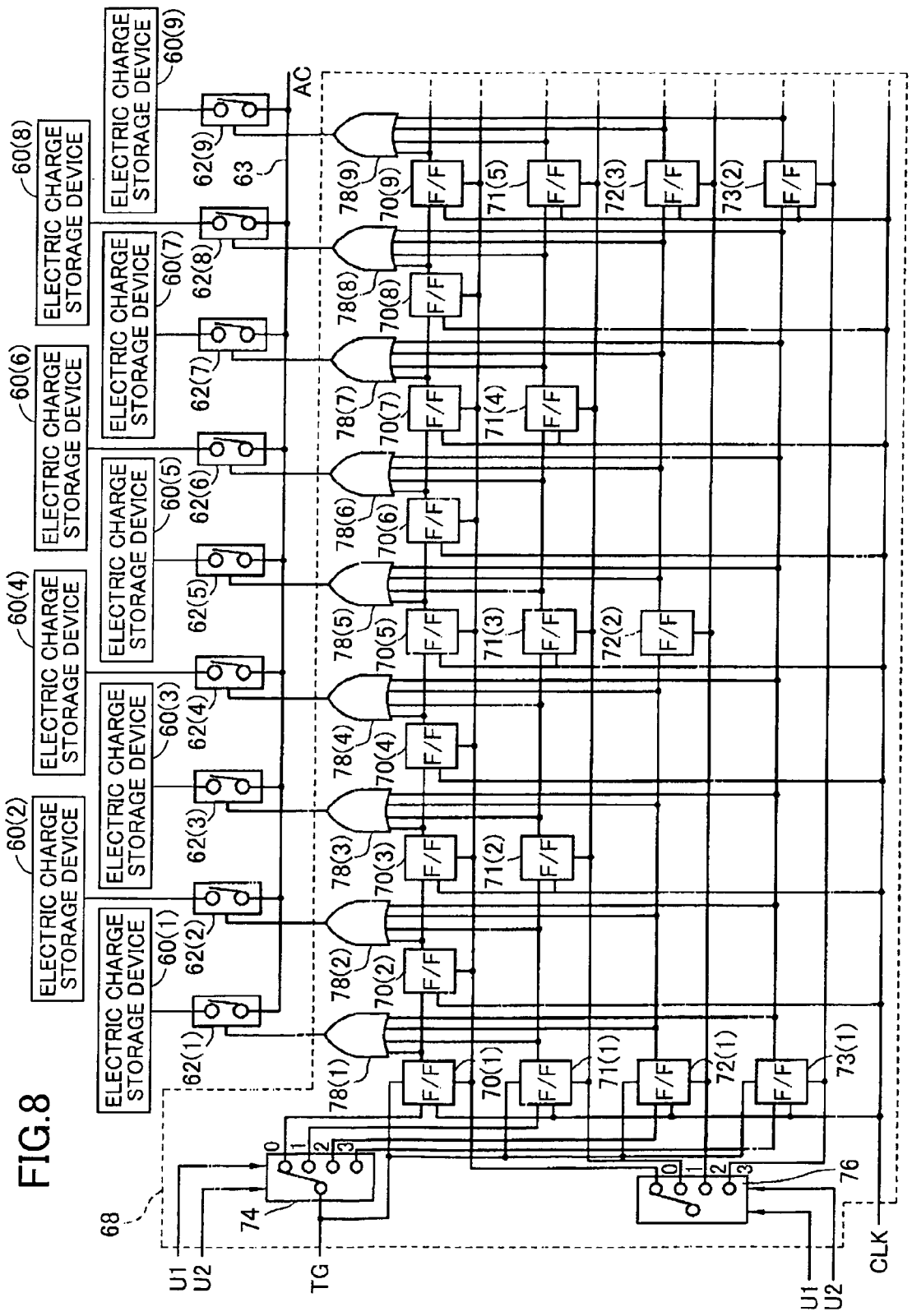
FIG. 8 is a circuit diagram showing the structure of a shift register shown in FIG. 6.

As shown in FIG. 8, the shift register 68 includes a plurality of D flip-flops 70(1), 70(2), . . . (hereinafter also referred to as the first row of flip-flops) corresponding to each of the switching elements 62(1), 62(2), . . . ; a plurality of D flip-flops 71(1), 71(2), . . . (hereinafter also referred to as the second row of flip-flops) provided in a ratio of one for each two switching elements 62; a plurality of D flip-flops 72(1), 72(2) (hereinafter also referred to as the third row of flip-flops) provided in a ratio of one for each four switching elements 62; and a plurality of D flip-flops 73(1), 73(2), (hereinafter also referred to as the fourth row of flip-flops) provided in a ratio of one for each eight switching elements 62. Electric charge storage devices 60 are provided for each switching element 62 and are configured of the light-receiving elements 22 and capacitors 61 described above.

The shift register 68 is configured to receive a trigger signal TG inputted from the resolution setting signal generator 64 and to input the trigger signal TG into the input terminals CLR of the D flip-flops 70(1), 71(1), 72(1), and 73(1).

The shift register 68 also receives a clock signal CLK from the resolution setting signal generator 64 and inputs the clock signal CLK into the input terminal CLK for each of the D flip-flops 70-73. The output signal from output terminals Q of the D flip-flops 70-73 are inputted into OR circuits 78(1), 78(2), . . . corresponding to each of the switching elements 62(1), 62(2), . . . , and are also inputted into the input terminals D on the next level of D flip-flops 70-73.

The shift register 68 also includes a switch 74 for selectively outputting the trigger signal TG inputted into the input terminal thereof from the resolution setting signal generator 64 to one of four output terminals 0-3; and a switch 76 for selectively applying a supply voltage Vdd applied to the input terminal thereof to one of four output terminals 0-3 for driving D flip-flops 70-73.

The switch 74 selects one of the output terminals 0-3 based on the resolution setting signals U1 and U2 received from the resolution setting signal generator 64. Specifically, the switch 74 selects output terminal 0 when the resolution setting signals U1 and U2 are "0" and "0" (1200-dpi resolution) so that the trigger signal TG is inputted into the input terminal D of the D flip-flop 70(1); selects output terminal 1 when the resolution setting signals U1 and U2 are "1" and "0" (600-dpi resolution) so that the trigger signal TG is inputted into the input terminal D of the D flip-flop 71(1); selects output terminal 2 when the resolution setting signals U1 and U2 are "0" and "1" (300-dpi resolution) so that the trigger signal TG is inputted into the input terminal D of the D flip-flop 72(1); and selects output terminal 3 when the resolution setting signals U1 and U2 are "1" and "1" (150-dpi resolution) so that the trigger signal TG is inputted into the input terminal D of the D flip-flop 73(1).

Similarly, the switch 76 selects output terminal 0 when the resolution setting signals U1 and U2 are "0" and "0" (1200-dpi resolution) so that the supply voltage Vdd is applied to an input terminal ENB of the first row of D flip-flops 70; selects output terminal 1 when the resolution setting signals U1 and U2 are "1" and "0" (600-dpi resolution) so that the supply voltage Vdd is applied to an input terminal ENB of the second row of D flip-flops 71; selects output terminal 2 when the resolution setting signals U1 and U2 are "0" and "1" (300-dpi resolution) so that the supply voltage Vdd is applied to an input terminal ENB of the third row of D flip-flops 72; and selects output terminal 3 when the resolution setting signals U1 and U2 are "1" and "1" (150-dpi resolution) so that the supply voltage Vdd is applied to an input terminal ENB of the fourth row of D flip-flops 73.

Next, the operations of the shift register 68 will be described for each resolution.

The first row of D flip-flops 70 is operated when the resolution is set to the maximum resolution of 1200 dpi. Specifically, after the trigger signal TG is inputted into the D flip-flop 70(1), the switching elements 62 are sequentially turned on one at a time, at each falling edge of the clock signal CLK. As a result, the electric charges (electric signals) accumulated in the charge storage devices 60 (specifically, the capacitors 61) are outputted as an image signal AO representing an image in the resolution 1200 dpi.

The second row of D flip-flops 71 is operated when the resolution is 600 dpi. Specifically, after the trigger signal TG is inputted into the D flip-flop 71(1), the switching elements 62 are sequentially turned on two at a time, at each falling edge of the clock signal CLK. As a result, the electric charges accumulated in the charge storage devices 60 are outputted as an image signal AO representing an image in the resolution 600 dpi.

The third row of D flip-flops 72 is operated when the resolution is 300 dpi. Specifically, after the trigger signal TG is inputted into the D flip-flop 72(1), the switching elements 62 are sequentially turned on four at a time, at each falling edge of the clock signal CLK. As a result, the electric charges accumulated in the charge storage devices 60 are outputted as an image signal AO representing an image in the resolution 300 dpi.

The fourth row of D flip-flops 73 is operated when the resolution is 150 dpi. Specifically, after the trigger signal TG is inputted into the D flip-flop 73(1), the switching elements 62 are sequentially turned on eight at a time, at each falling edge of the clock signal CLK. As a result, the electric charges accumulated in the charge storage devices 60 are outputted as an image signal AO representing an image in the resolution 150 dpi.

Figure 9:
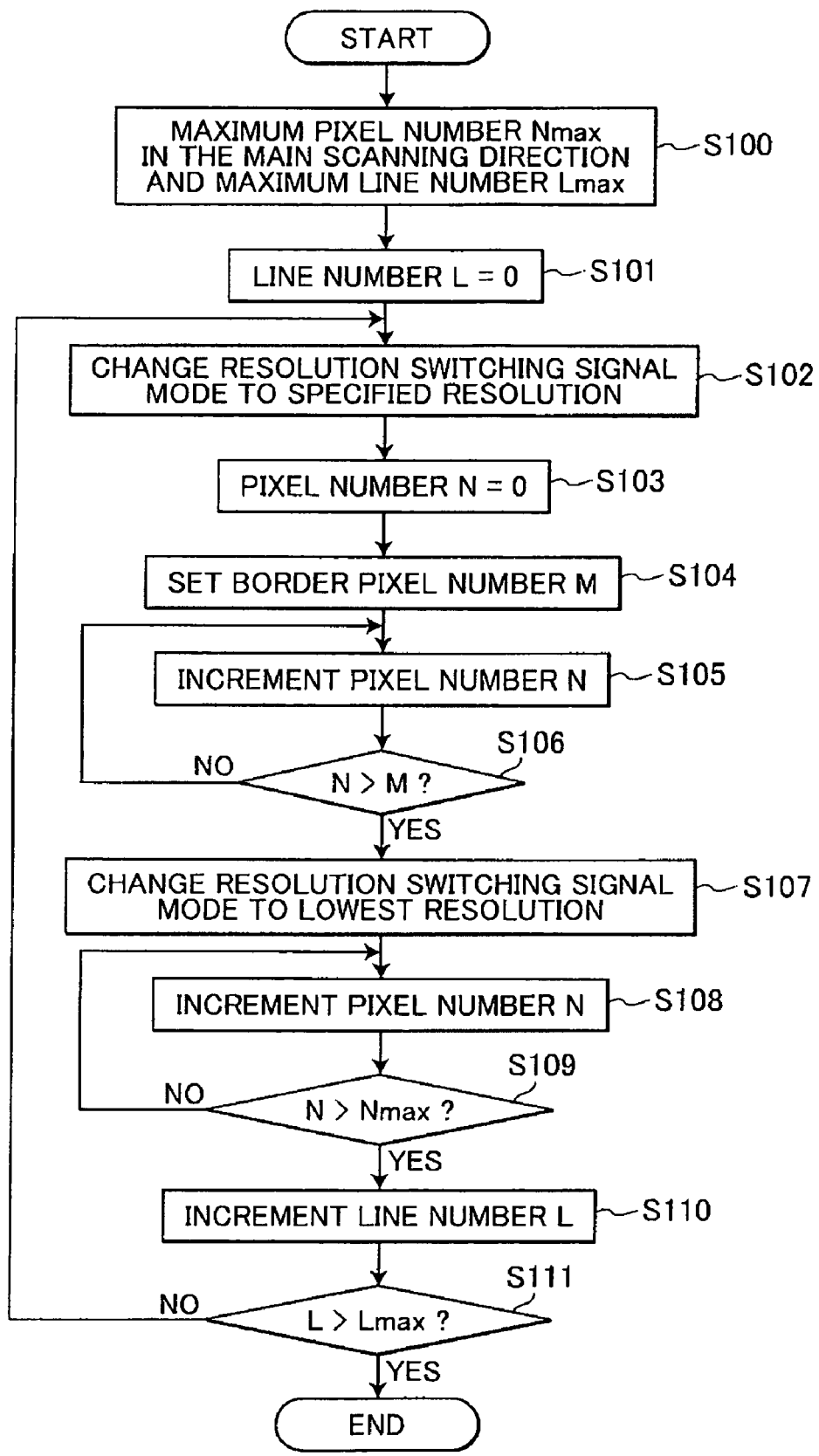
FIG. 9 is a flowchart illustrating steps in a resolution switching process performed by a CPU shown in FIG. 3 for reading an original document.
Figure 11A:
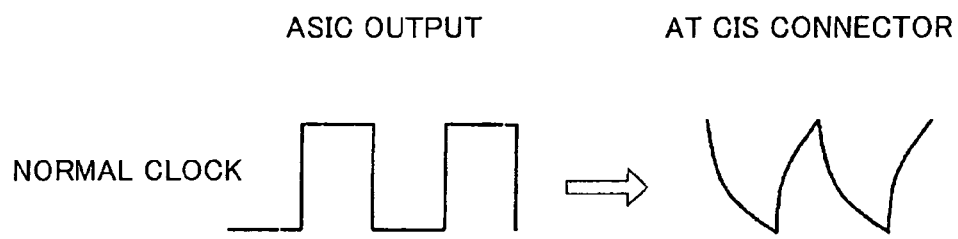
FIGS. 11A and 11B are explanatory diagrams illustrating clock levels before and after increasing the clock speed.
Figure 11B:
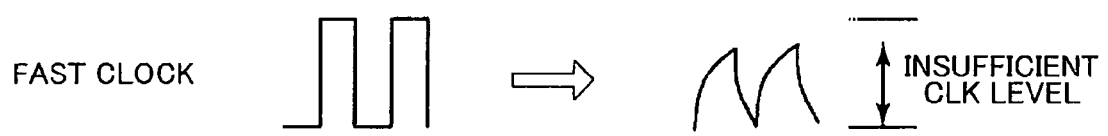

Next, a process of switching the resolution during one original document will be described with reference to FIG. 9.

In S100 the CPU 38 sets a maximum pixel number Nmax for the main scanning direction and a maximum line number Lmax for a single sheet of an original document based on a resolution specified by the resolution switching signal MODE that the user previously set through resolution setting operations and the like.

In S101 the CPU 38 initializes a line number L to 0. In S102 the CPU 38 changes the resolution switching signal MODE to the resolution that the user previously set through resolution setting operations. As described above, by changing the resolution in this way, the CPU 38 selects the input terminal of the switch 48 as the source of the signal to be outputted, determining the resolution setting signals U1 and U2 to be outputted from the resolution setting signal generator 64. The resolution setting signals U1 and U2 in turn select the output terminals of the switches 74 and 76 in the shift register 68. Hereafter, images are read according to the specified resolution.

In S103 the CPU 38 initializes a pixel number N in the main scanning direction of the current line to 0. In S104 the CPU 38 sets a border pixel number M to the number of pixels in the width direction of an original document having a size previously specified by the user in a manual setting operations or a size previously detected by an optical sensing means. In the preferred embodiment, it will be assumed that the original document is placed flush with a side of the first platen glass 14 corresponding to the reading start position.

In S105 the CPU 38 increments the pixel number N by 1 for each pixel read. In S106 the CPU 38 determines whether the pixel number N is greater than the border pixel number M. If the pixel number N is less than or equal to the border pixel number M (S106: NO), then a pixel within the pixel segment inside the original document has been read. Accordingly, the CPU 38 returns to S105 and repeats S105 and S106.

If the pixel number N is greater than the border pixel number M (S106: YES), then in S107 the CPU 38 changes the resolution switching signal MODE to the lowest resolution (150-dpi resolution in the present embodiment). As described above, the CPU 38 selects output terminal 3 of the switch 48 at this time so that the resolution setting signals U1 and U2 outputted from the resolution setting signal generator 64 are "1" and "1", selecting the output terminals 3 of the switches 74 and 76 in the shift register 68. Hence, hereafter image reading is performed at the lowest resolution of 150 dpi.

In S108 the CPU 38 increments the pixel number N by a ratio of the specified resolution to the minimum resolution for each pixel read. In S109 the CPU 38 determines whether the pixel number N is greater than the maximum pixel number Nmax. For example, if the specified resolution is 1200 dpi, the pixel number N is incremented by 1200÷150=8. If the pixel number N is less than or equal to the maximum pixel number Nmax (S109: NO), then the CPU 38 returns to S108 and repeats steps S108 and S109.

When the pixel number N is greater than the maximum pixel number Nmax (S109: YES), then in S110 the CPU 38 increments the line number L by 1. In S111 the CPU 38 determines whether the line number L is greater than the maximum line number Lmax. If the line number L is less than or equal to the maximum line number Lmax (S111: NO), then the CPU 38 returns to S102 and repeats the steps S102 through S111.

When the line number L is greater than the maximum line number Lmax (S111: YES), the CPU 38 ends the image-reading process for the original document.

When reading a color image, the image-reading operation is performed separately for each color using light sources 26 for red, green, and blue.

In the first embodiment described above, the resolution is switched to the lowest resolution at a border pixel between a pixel segment inside the original document and a pixel segment outside the original document in each line when reading an A4-size original document with a contact image sensor for an A3-size original document, for example. This reduces the number of pixels outputted for the unnecessary pixel segment outside the original document, thereby shortening the image-reading time in the pixel segment outside the original document and increasing the image-reading speed for the overall original document.

In the first embodiment described above, the resolution switching signal MODE is changed to the lowest resolution of 150 dpi when the pixel number N for the main scanning direction becomes greater than the border pixel number M. However, the resolution need not be changed to the lowest resolution, provided that the resolution is changed to a resolution lower than the specified resolution.

In the first embodiment described above, the original document is placed on the first platen glass 14 so as to be flush with a side of the first platen glass 14 corresponding to a reading start position (left-justified). However, it should be apparent that the present invention could be similarly applied when the original document is positioned in the center of the first platen glass 14. In this case, the resolution is initially set to the lowest resolution when reading an A4-size original document with a contact image sensor for an A3-size original document, for example. Next, the resolution is changed to the specified resolution at a border pixel between the pixel segment outside the original document and the pixel segment inside the original document for each line and is subsequently returned to the lowest resolution at a border pixel between the pixel segment inside the original document and the pixel segment outside the original document. This reduces the number of pixels outputted for the unnecessary pixel segment outside the original document, thereby shortening the image-reading time in the pixel segment outside the original document and increasing the image-reading speed for the overall original document.

While the first embodiment of the present invention has been described above, it should be apparent that the present invention may be used in various forms.

For example, as shown in FIG. 10, the clock signal CLK may be increased in frequency (from 3.3 to 6.6 MHz in the example of FIG. 10) at the same time the resolution is switched to the lowest resolution at the border pixel between the pixel segment inside the original document and the pixel segment outside the original document. By doing so it is possible to further shorten the image-reading time per line while reducing the number of pixels read and improving the pixel-reading speed in the unnecessary pixel segment outside the original document, thereby further increasing the image-reading speed for the overall original document.

When reading an A4-size original document placed in the center of the first platen glass 14 according to the second embodiment using a contact image sensor for an A3-size original document, for example, initially the resolution is set to the lowest resolution, and the clock signal CLK is increased simultaneously, from 3.3 to 6.6 MHz in the example of FIG. 10. Next, the resolution is changed to the specified resolution at the border pixel between the pixel segment outside the original document and the pixel segment inside the original document for the current line, while the clock signal CLK is simultaneously reduced from 6.6 to 3.3 MHz in the example of FIG. 10. Next, the resolution is returned to the lowest resolution at the border pixel between the pixel segment inside the original document and the pixel segment outside the original document, while the clock signal CLK is simultaneously increased back to 6.6 MHz in the example of FIG. 10. In this way, it is possible to reduce the number of pixels being outputted and to increase the clock speed (i.e., clock frequency) within the unnecessary pixel segment outside the original document, thereby reducing the image-reading time in this pixel segment and further increasing the image-reading speed for the overall original document.

While the invention has been described in detail with reference to specific embodiments thereof, it would be apparent to those skilled in the art that many modifications and variations may be made therein without departing from the spirit of the invention, the scope of which is defined by the attached claims.

What is claimed is:

1. An image-reading device that reads an image of an original document line by line, each line image extending in a main scanning direction, the image reading device comprising:
    an image sensor having a plurality of photodetectors arranged linearly in the main scanning direction;
    a clock generator that generates clocks having a clock speed;
    a resolution setting unit that sets a resolution of the image sensor in the main scanning direction, the image sensor being configured to output an image signal of the read image of the original document at the resolution set by the resolution setting unit;
    a border pixel determiner configured to determine that one of the plurality of photodetectors has read a border pixel, the border pixel being one of a plurality of pixels in a line image of the original document, the line image including a first plurality of pixels, a second plurality of pixels, wherein the border pixel is positioned between the first plurality of pixels and the second plurality of pixels; and
    a resolution switching unit that switches, during reading one line image extending in the main scanning direction, the resolution set by the resolution setting unit from a first resolution to a second resolution different from the first resolution when the border pixel determiner determines that one of the plurality of photodetectors has read the borderpixel, such that the image sensor outputs the image signal corresponding to the first plurality of pixels of the one line image at the first resolution and outputs the image signal corresponding to the second plurality of pixels of the one line image at the second resolution.

2. The image-reading device according to claim 1, wherein the plurality of photodetectors sequentially reads pixels on a pixel-by-pixel basis or sequentially reads pixel groups comprising multiple pixels along a line of the original document with one of the first resolution and the second resolution set by the resolution switching unit and in synchronism with the clocks generated by the clock generator.

3. The image-reading device according to claim 1, further comprising a clock speed changing unit that changes the clock speed at a position between the pixel segment inside the original document and the pixel segment outside the original document.

4. The image-reading device according to claim 3, wherein the clock speed changing unit changes the clock speed within the pixel segment outside the original document to a faster speed than that in the pixel segment inside the original document.

5. The image-reading device according to claim 1, wherein the second resolution is a lower resolution than the first resolution, and the resolution switching unit switches to the second resolution when one of the plurality of photodetectors has read the border pixel between the pixel segment inside the original document and the pixel segment outside the original document in each line.

6. An image-reading device according to claim 1, further comprising a border pixel determining unit that determines the border pixels for each line of the original document based on an original document size that is set manually.

7. The image-reading device according to claim 1, further comprising an optical sensing unit that optically detects the border pixel in each line of the original document.

8. The image-reading device according to claim 1, further comprising an original-supporting member having an original supporting surface on which the original document is placed, wherein the original document is left justified on the original-supporting surface.

9. An image-reading device that reads an image of an original document line by line, each line image extending in a main scanning direction, the image reading device comprising:
    an image sensor having a plurality of photodetectors arranged linearly in the main scanning direction;
    a clock generator that generates clocks having a clock speed;
    a resolution setting unit that sets a resolution of the image sensor in the main scanning direction, the image sensor being configured to output an image signal of the read image of the original document at the resolution set by the resolution setting unit;
    a border pixel determiner configured to determine that a first one of the plurality of photodetectors has read a first border pixel, and to determine that a second one of the plurality of photodetectors has read a second border pixel, the first border pixel and the second border pixel being pixels of a plurality of pixels on a line image of the original document, the line image including a first plurality of pixels and a second plurality of pixels;

a resolution switching unit that switches, during reading one line image extending in the main scanning direction, the resolution set by the resolution setting unit from a first resolution to a second resolution different from the first resolution when the border pixel determiner determines that the first one of the plurality of photodetectors has read the first border pixel between a first pixel segment outside the original document and a second pixel segment inside the original document and when the second one of the plurality of photodetectors has read the second border pixel between the second pixel segment inside the original document and a third pixel segment outside the original document while reading one line of the original document.

10. The image-reading device according to claim 9 wherein the plurality of photodetectors sequentially reads pixels on a pixel-by-pixel basis or sequentially reads pixel groups comprising multiple pixels along a line of the original document with one of the first resolution and the second resolution set by the resolution switching unit and in synchronism with the clocks generated by the clock generator.

11. The image-reading device according to claim 9, further comprising a clock speed changing unit that changes the clock speed at positions between the first pixel segment and the second pixel segment and between the second pixel segment and the third pixel segment.

12. The image-reading device according to claim 11, wherein the clock speed changing unit changes the clock speed within the first and third pixel segments to a faster speed than that within the second pixel segment.

13. The image-reading device according to claim 9, wherein the second resolution is a higher resolution than the first resolution, and the resolution switching unit switches to the second resolution when the first one of the plurality of photodetectors has read the first border pixel of each line and switches the resolution to a low resolution when the second one of the plurality of photodetectors has read the second border pixel of each line.

14. The image-reading device according to claim 9, further comprising a border pixel determining unit that determines the first and second border pixels for each line of the original document based on an original document size that is set manually.

15. The image-reading device according to claim 9, further comprising an optical sensing unit that optically detects the first and second border pixels in each line of the original document.

16. The image-reading device according to claim 9, further comprising an original-supporting member having an original supporting surface on which the original document is placed, wherein the original document is centrally position on the original-supporting surface.

17. The image-forming device according to claim 1, wherein the first plurality of pixels are positioned inside the original document and the second plurality of pixels are positioned outside of the original document.

* * * * *